(12) United States Patent
Torigoe et al.

(10) Patent No.: US 11,300,356 B2
(45) Date of Patent: Apr. 12, 2022

(54) DRYING DEVICE FOR COLUMNAR STRUCTURE, AND METHOD FOR MANUFACTURING COLUMNAR STRUCTURE

(71) Applicant: QUALICAPS CO., LTD., Yamatokoriyama (JP)

(72) Inventors: Minoru Torigoe, Tokyo (JP); Masaaki Mori, Tokyo (JP); Koji Yamauchi, Tokyo (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 106 days.

(21) Appl. No.: 16/754,166

(22) PCT Filed: Nov. 6, 2018

(86) PCT No.: PCT/JP2018/041079
§ 371 (c)(1),
(2) Date: Apr. 7, 2020

(87) PCT Pub. No.: WO2019/111614
PCT Pub. Date: Jun. 13, 2019

(65) Prior Publication Data
US 2021/0131730 A1    May 6, 2021

(30) Foreign Application Priority Data
Dec. 6, 2017  (JP) .............................. JP2017-234040

(51) Int. Cl.
*F26B 19/00*   (2006.01)
*F26B 3/04*    (2006.01)
(Continued)

(52) U.S. Cl.
CPC ................ *F26B 3/04* (2013.01); *B29C 41/46* (2013.01); *F26B 21/00* (2013.01)

(58) Field of Classification Search
CPC .......... F26B 3/04; F26B 21/00; F26B 21/004; F26B 9/06; B29C 41/46; A61J 3/077
(Continued)

(56) References Cited

U.S. PATENT DOCUMENTS 579,392 A     3/1897   Hubei et al.
4,705,658 A *  11/1987  Lukas .................... A61J 3/077
                                                   264/297.8
(Continued)

FOREIGN PATENT DOCUMENTS

JP    S63127757 A    5/1988
JP    H6-508051 A    9/1994
(Continued)

OTHER PUBLICATIONS

The extended European search report of the corresponding EP application No. 18884860 dated Aug. 6, 2021.

*Primary Examiner* — John P Mccormack
(74) *Attorney, Agent, or Firm* — Muncy, Geissler, Olds & Lowe, P.C.

(57) ABSTRACT

Provided is a device (1) for drying a columnar structure (30) supported upright on a supporting surface (2a), wherein a feeding part (5a) for feeding drying gas toward the supporting surface (2a) and a discharge part (6b) for discharging the fed drying gas are both provided in an opposing surface (6a) facing the supporting surface (2a). A plurality of feeding parts (5a) and a plurality of discharge parts (6b) are preferably provided, and the plurality of discharge parts (6b) are preferably symmetrically disposed around one feeding part (5a).

18 Claims, 6 Drawing Sheets

(51) Int. Cl.
*B29C 41/46* (2006.01)
*F26B 21/00* (2006.01)

(58) Field of Classification Search
USPC .......... 34/215, 107, 210, 201, 413, 417, 103
See application file for complete search history.

(56) References Cited

U.S. PATENT DOCUMENTS

| | | | | |
|---|---|---|---|---|
| 6,000,928 | A * | 12/1999 | Victorov | B29C 41/14 425/270 |
| 7,608,462 | B2 * | 10/2009 | Hofmann | F26B 21/007 422/407 |
| 2010/0199510 | A1 * | 8/2010 | Plavnik | B41F 23/0466 34/60 |

FOREIGN PATENT DOCUMENTS

| | | | |
|---|---|---|---|
| JP | 2001058304 | A | 3/2001 |
| JP | 2004160393 | A | 6/2004 |
| WO | 92/21311 | A1 | 12/1992 |

\* cited by examiner (a)   (b)   (c)   (d)

_(56) References Cited_

DRYING DEVICE FOR COLUMNAR STRUCTURE, AND METHOD FOR MANUFACTURING COLUMNAR STRUCTURE

TECHNICAL FIELD

The present invention relates to a drying device for columnar structures and a method for manufacturing columnar structures and, more specifically, relates to a drying device for columnar structures wherein the columnar structures are dried by feeding a gas, and a method for manufacturing columnar structures wherein the drying device is used.

BACKGROUND ART

The device for manufacturing pharmaceutical cellulose capsules disclosed in Patent Literature 1 is a known example of a device for drying columnar structures. This device is configured such that pins for supporting capsules in a drying furnace are heated to dry the capsules from the inside, and moisture released to the outside of the capsules is discharged from the drying furnace by air that flows in a direction opposite to the direction of movement of the pins.

CITATION LIST

Patent Literature

Patent Literature 1: JP H6-508051A

SUMMARY OF INVENTION

Technical Problem

However, the above-described conventional device likely has a complex configuration for heating the pins, requires excessive electricity, and thus has the problem of an increased manufacturing cost and running cost.

Moreover, since the air inside the drying furnace flows in the radial direction of the capsules, there is the problem that the unevenness of drying due to the direction of airflow likely results in non-uniform capsule thickness, and lowering the flow rate of air to avoid this phenomenon is problematic by requiring a long drying time.

Accordingly, an object of the present invention is to provide a drying device for columnar structures, which is capable of uniformly drying the columnar structures promptly and easily.

Solution to Problem

The object of the present invention is achieved by a drying device for a columnar structure supported upright on a supporting surface, wherein a feeding part for feeding drying gas toward the supporting surface and a discharge part for discharging the fed drying gas are both provided in an opposing surface facing the supporting surface.

In this drying device for a columnar structure, a plurality of feeding parts and a plurality of discharge parts are preferably provided, and the plurality of discharge parts are preferably symmetrically disposed around one feeding part.

Moreover, a circumferential wall defining a drying space between the supporting surface and the opposing surface is preferably provided, and the feeding part and the discharge part are preferably provided only in the opposing surface on the drying space. The discharge part preferably brings the drying space into communication with a discharge path, and the feeding part preferably comprises an introduction tube extending across the discharge path and facing the drying space.

The discharge part is preferably disposed on the axis of the columnar structure.

The feeding part is preferably disposed away from the axis of the columnar structures.

Advantageous Effects of Invention

The present invention can provide a drying device for columnar structures, which is capable of uniformly drying the columnar structures promptly and easily.

DESCRIPTION OF EMBODIMENTS

Figure 1:
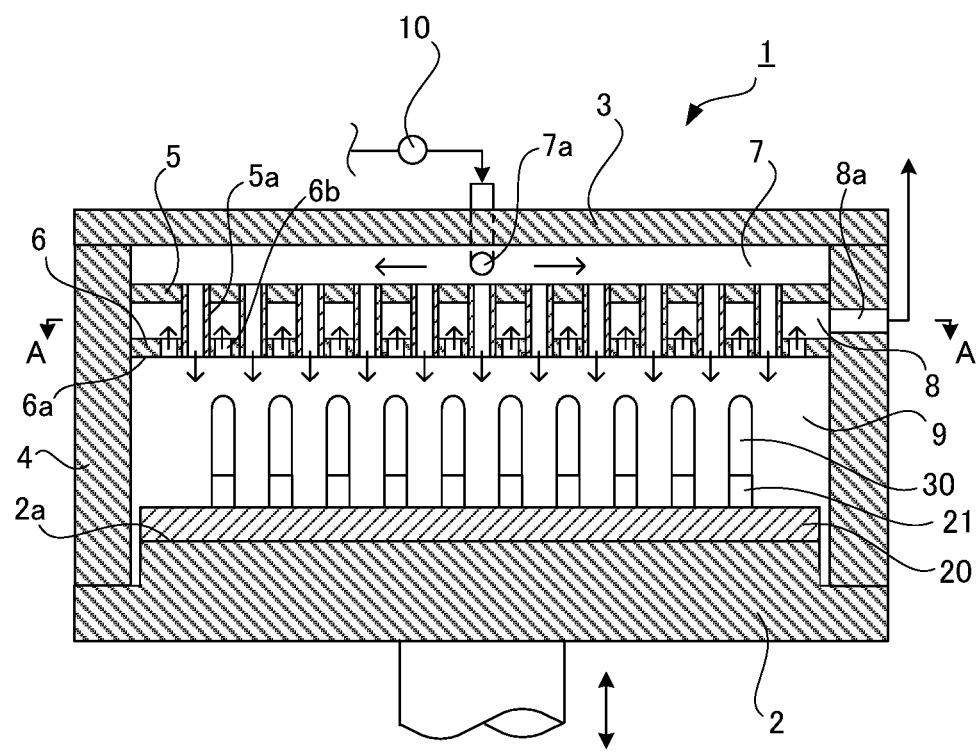
FIG. 1 is a vertical cross-sectional view of a drying device according to one embodiment of the present invention.

Below, an embodiment of the present invention will now be described with reference to the attached drawings. FIG. 1 is a vertical cross-sectional view of a drying device according to one embodiment of the present invention. As shown in FIG. 1, a drying device 1 is configured such that the space between a bottom plate 2 and a top plate 3 is surrounded by a circumferential wall 4. The upper space inside the peripheral wall 4 is partitioned by a first partition plate 5 and a second partition plate 6 disposed so as to be parallel to the top plate 3, a drying gas introduction path 7 is formed between the top plate 3 and the first partition plate 5, and a drying gas discharge path 8 is formed between the first partition plate 5 and the second partition plate 6.

A drying space 9 defined by being surrounded by the circumferential wall 4 is formed between a supporting surface 2a on the upper surface side of the bottom plate 2 and an opposing surface 6a on the lower surface side of the second partition plate 6. The bottom plate 2 is provided so as to be capable of being raised and lowered as indicated by the arrows, and by placing columnar structures 30, which are the objects to be dried, on the supporting surface 2a of the bottom plate 2 at the lowered position and raising the bottom plate 2 to the raised position shown in FIG. 1, the lower part of the drying space 9 is closed, and the columnar structures 30 are accommodated within the drying space 9.

The introduction path 7 is connected to an air blower 10 via an air supply hole 7a formed in the circumferential wall 4, and drying gas is introduced into the introduction path 7. A plurality of feeding parts 5a each composed of an introduction tube that brings the introduction path 7 and the drying space 9 into communication with each other are provided between the first partition plate 5 and the second partition plate 6, and drying gas is fed from the feeding parts 5a toward the supporting surface 2a in the drying space 9 in a direction substantially perpendicular to the supporting surface 2a. Gas having a suitably controlled temperature, such as hot air, cold air, or normal-temperature air, can be used as drying gas according to the material and the application of the objects to be dried.

The second partition plate 6 has a plurality of discharge parts 6b each composed of a through-hole. The discharge path 8 is in communication with the drying space 9 via the discharge parts 6b, and is in communication with the outside via a discharge hole 8a formed in the circumferential wall 4.

Figure 2:
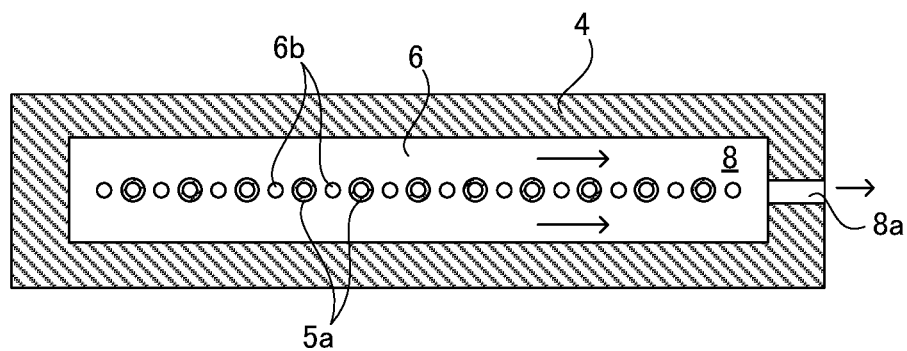
FIG. 2 is a cross-sectional view taken along the line A-A of FIG. 1.

FIG. 2 is a cross-sectional view taken along the line A-A of FIG. 1 and shows the inside of the discharge path 8. As shown in FIG. 2, the feeding parts 5a and the discharge parts 6b are alternately disposed in line at regular intervals. Drying gas discharged from the drying space 9 to the discharge path 8 passes the feeding parts 5a that extend perpendicular to the flow direction indicated by the arrows, and is released to the outside through the discharge hole 8a.

Figure 10:
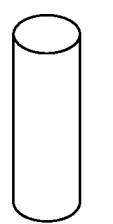
FIG. 10 is a perspective view illustrating columnar structures manufactured by using the drying device of the present invention.
Figure 10:
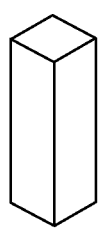
Figure 10:
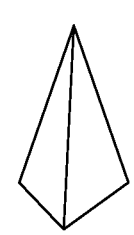
Figure 10:
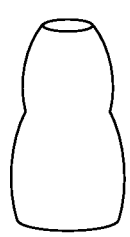

The drying device 1 having the above-described configuration can be suitably used for manufacturing and drying the columnar structures 30. As illustrated in FIG. 10, the shape of the columnar structures 30 may be any of (a) a cylinder, (b) a rectangular prism (such as a cuboid), (c) a triangular pyramid, (d) a bulbous cylinder, and the like, and the columnar structures 30 may be either hollow or solid. The columnar structures 30 are supported so as to be upright on the supporting surface 2a of the bottom plate 2 such that the longitudinal direction (the axial direction) is perpendicular to the supporting surface 2a. The columnar structure 30 may be directly supported on the supporting surface 2a, or may be supported on the supporting surface 2a via a bed plate 20 or the like as will be described below. When supporting the columnar structures 30 on the supporting surface 2a, the supporting surface 2a does not need to support the columnar structures 30, and the columnar structures 30 can be supported by a component different from the supporting surface 2a. For example, the columnar structures 30 may be supported in a suspended manner from the opposing surface 6a so as not to block the feeding parts 5a and the discharge parts 6b of the opposing surface 6a or, alternatively, the columnar structures 30 may be supported by a beam or the like disposed between the supporting surface 2a and the opposing surface 6a so as not to substantially impede the airflow.

The columnar structures 30 of the present embodiment are hollow hard capsules used for medicines, foods, and the like, and attached to a plurality of molding pins 21 provided on the bed plate 20 removably placed on the supporting surface 2a. The hard capsules can be formed from a material such as water-soluble cellulose such as hypromellose (hydroxypropylmethylcellulose), or gelatin, and the material can be attached to the molding pins 21 by immersing the molding pins 21 in a solution of the material. The plurality of molding pins 21 are preferably disposed immediately below the respective discharge parts 6b when the bed plate 20 is placed on the supporting surface 2a in a positionally adjusted manner. On the other hand, the feeding parts 5a are preferably disposed away from the axes of the plurality of molding pins 21.

Next, the operation of the drying device 1 of the present embodiment will now be described. As shown in FIG. 1, when the columnar structures 30 are accommodated in the drying space 9, and the air blower 10 is operated, drying gas is fed to the drying space 9 from the feeding parts 5a provided in the opposing surface 6a, and the drying gas is discharged through the discharge parts 6b also provided in the opposing surface 6a.

Figure 3:
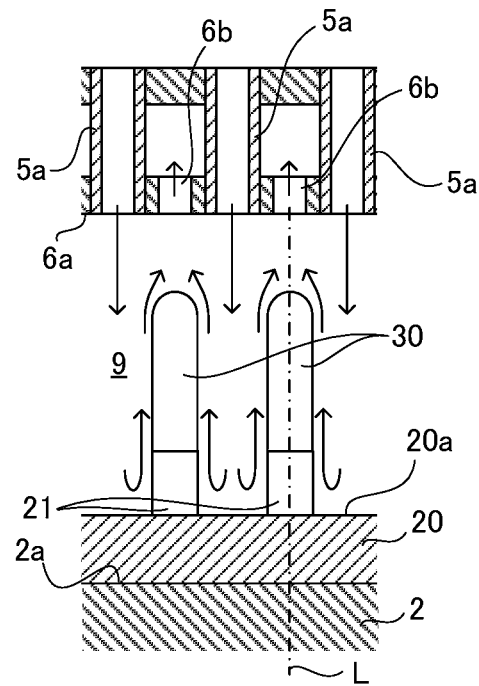
FIG. 3 is an enlarged cross-sectional view of relevant parts of the drying device shown in FIG. 1.

FIG. 3 is an enlarged cross-sectional view of relevant parts of the drying device 1. The discharge parts 6b are disposed on axes L of the columnar structures 30, and the feeding parts 5a are disposed away from the axes of the adjacent columnar structures 30, 30. Accordingly, drying gas fed from the feeding parts 5a flows downward between the adjacent columnar structures 30, 30, then rebounds off an upper surface 20a of the bed plate 20 supported by the supporting surface 2a, ascends along the outer surfaces of the columnar structures 30, 30, and is discharged through the discharge parts 6b. In this way, the columnar structures 30 are dried, and thus hard capsules are produced.

In the drying device 1 of the present embodiment, the feeding parts 5a and the discharge parts 6b are both provided in the opposing surface 6a facing the supporting surface 2a, thus openings for creating an airflow do not need to be formed on the supporting surface 2a side, a reduced strength of the bed plate 20 and a complex apparatus configuration can be prevented, and an airflow in the direction of the axes L can be easily formed in the vicinity of the outer surfaces of the columnar structures 30 due to the rebounding of drying gas on the supporting surface 2a side. Moreover, this upward airflow forms an air curtain, and thus even when a horizontal airflow occurs in the drying space 9, buffeting of this horizontal airflow with the columnar structures 30 can be prevented. Accordingly, the columnar structures 30 can be uniformly dried in a prompt manner, and the thickness of hard capsules can be prevented from becoming circumferentially non-uniform. While it is preferable not to form openings for creating an airflow on the supporting surface 2a side as described above, openings having an area of 50% or less based on the total area of the openings in the opposing surface 6a may be provided to finely regulate airflow formation.

In the present embodiment, as shown in FIG. 2, a plurality of feeding parts 5a and discharge parts 6b are alternately disposed in line at regular intervals, and two discharge parts 6b are symmetrically positioned about each feeding part 5a, with the feeding part 5a being at the center. According to this configuration, an airflow that is axially symmetrical relative to the axis of each feeding part 5a can be formed, thus a circumferentially more uniform airflow can be easily formed around the columnar structures 30, and uniform drying of the columnar structures 30 can be promoted. In the present embodiment, the feeding parts 5a are composed of introduction tubes that extend perpendicular to the flow direction in the discharge path 8 and that face the drying space 9, and thus the above-described symmetrical placement of the discharge parts 6b relative to the feeding parts 5a can be easily achieved.

While the position of the discharge parts 6b relative to the columnar structures 30 is not necessarily limited, the discharge parts 6b are preferably on the axes L of the columnar structures 30 as in the present embodiment. Accordingly, an airflow in the direction of the axes L along the outer surfaces of the columnar structures 30 can be easily created. The position of the feeding parts 5a relative to the columnar structures 30 is also not particularly limited, and the feeding parts 5a are preferably placed away from the axes L of the columnar structures 30 as in the present embodiment. Accordingly, local drying resulting from a direct buffeting of flowing air with the columnar structures 30 can be reliably prevented. While the direction of feeding drying gas from the feeding parts 5a toward the supporting surface 2a is preferably perpendicular to the supporting surface 2a, it may be slightly inclined relative to the perpendicular direction. In this case, the extension line of the feeding direction of the feeding parts 5a (the center line direction of the openings) preferably does not intersect the columnar structures 30.

As in the present embodiment, the drying of the columnar structures 30 is preferably performed in the drying space 9 where the space between the supporting surface 2a and the opposing surface 6a is surrounded by the circumferential wall 4 and, accordingly, creation of an airflow in the radial direction around the columnar structures 30 can be more reliably suppressed. It is preferable that in the drying space 9, the feeding parts 5a and the discharge parts 6b are formed only in the opposing surface 6a and that the drying space 9 is completely closed except at the feeding parts 5a and the discharge parts 6b, but part of the supporting surface 2a or the peripheral wall 4 may have gaps or openings that are formed supplementally or unavoidably, or, alternatively, it is possible that the peripheral wall 4 does not exist and that the portions other than the supporting surface 2a and the opposing surface 6a are openings. In FIG. 1, drying gas is introduced into the introduction path 7 from the air supply hole 7a by the air blower 10, but instead of providing the air blower 10, drying gas may be introduced into the introduction path 7 by connecting a discharge-air blower (not shown) to the discharge hole 8a. Also, the air blower 10 and the discharge-air blower may be used in combination.

A possible reason why the above-described operation of the drying device 1 of the present embodiment enables the columnar structures 30 to be uniformly dried promptly and easily is as follows.

In order to uniformly dry the entirety of the columnar structures 30, the airflow around the columnar structures 30 needs to be uniform. When the airflow in the direction parallel to the supporting surface 2a is dominant as in conventional drying furnaces, an uneven airflow is inevitably created in the circumferential direction of the columnar structures 30. In order to avoid this, the airflow around the columnar structures 30 is preferably in the axial direction. That is to say, by disposing both the feeding parts 5a and the discharge parts 6b in the opposing surface 6a that faces the supporting surface 2a, the airflow around the columnar structures 30 can be substantially in the axial direction as described above. In addition, by symmetrically disposing a plurality of discharge parts 6b around one feeding part 5a, a more uniform airflow can be created in the circumferential direction of the columnar structures 30. Moreover, by disposing the discharge parts 6b on the axes of the columnar structures 30 and disposing the feeding parts 5a away from the axes of the columnar structures 30, the airflow around the columnar structures 30 can be more uniform.

Figure 4:
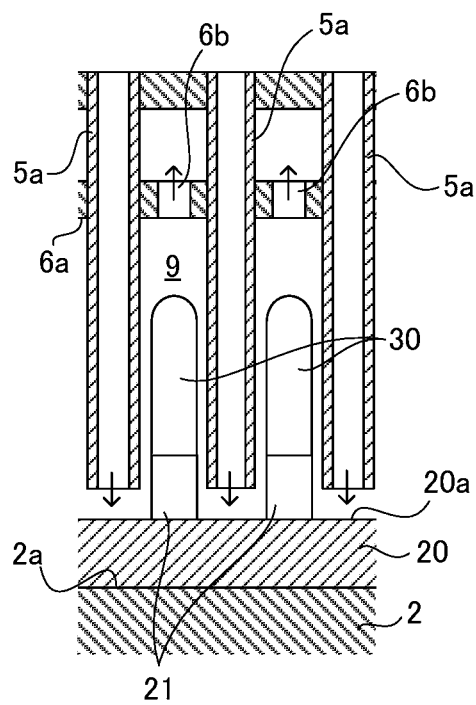
FIG. 4 is an enlarged cross-sectional view of relevant parts of a drying device according to another embodiment of the present invention.

One embodiment of the present invention has been described in detail above, but the specific aspects of the present invention are not limited to the above embodiment. For example, while the drying device 1 of the above embodiment is configured such that the ends of the feeding parts 5a are flush with the opposing surface 6a, the ends of the feeding parts 5a composed of introduction tubes may extend into the drying space 9 as shown in FIG. 4, and, accordingly, the airflow in the axial direction can be more reliably formed in the vicinity of the outer surfaces of the columnar structures 30. While the ends of the feeding parts 5a are positioned lower than the columnar structures 30 in FIG. 4, the ends may be near the center of the columnar structures 30 or higher than the columnar structures 30, and may be suitably set in consideration of the flow rate of drying gas, the length and arrangement of the columnar structures 30, and the like.

Figure 5:
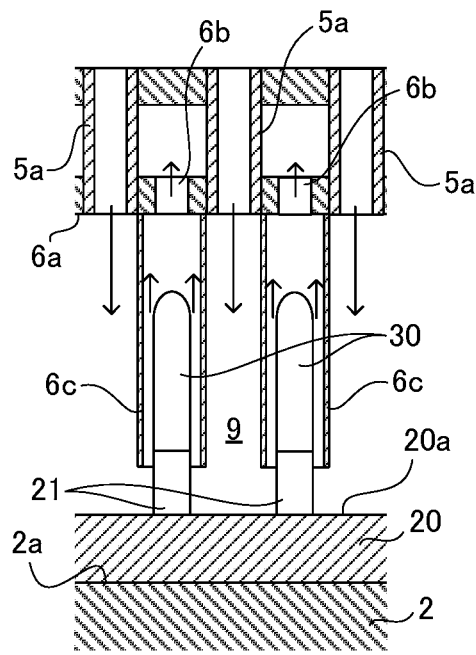
FIG. 5 is an enlarged cross-sectional view of relevant parts of a drying device according to yet another embodiment of the present invention.

As shown in FIG. 5, a plurality of guide cylinders 6c for accommodating the columnar structures 30 may be provided on the opposing surface 6a. The guide cylinders 6c extend into the drying space 9 from the circumferential edges of the openings of the discharge parts 6b, and a slight gap is formed between the inner circumferential surfaces of the guide cylinders 6c and the outer surfaces of the columnar structures 30. According to this configuration, drying gas to be discharged through the discharge parts 6b reliably travels in the axial direction in the vicinity of the outer surfaces of the columnar structures 30, and buffeting of air flowing in the radial direction with the columnar structures 30 can be reliably prevented by the guide cylinders 6c.

Figure 6:
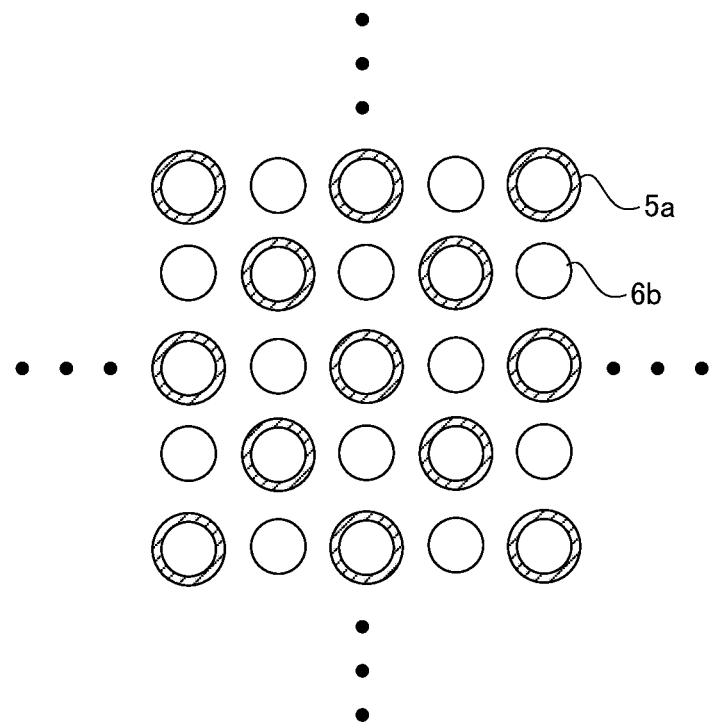
FIG. 6 is an enlarged view of relevant parts of a drying device according to yet another embodiment of the present invention.
Figure 7:
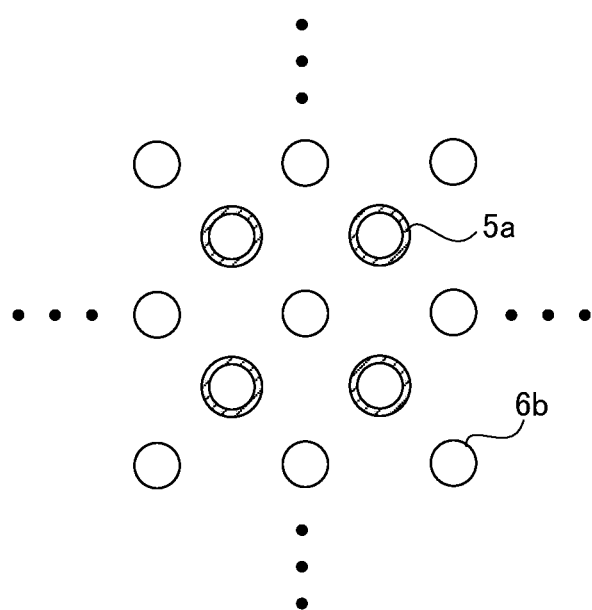
FIG. 7 is an enlarged view of relevant parts of a drying device according to yet another embodiment of the present invention.

When symmetrically disposing a plurality of discharge parts 6b around each feeding part 5a at the center, the position of each of the feeding parts 5a and the discharge parts 6b is not particularly limited. For example, as shown in FIG. 6, both the feeding parts 5a and the discharge parts 6b can be arranged in a staggered form, or as shown in FIG. 7, the feeding parts 5a and the discharge parts 6b can be disposed in a matrix form. The above-described symmetrical arrangement of the discharge parts 6b relative to the feeding parts 5a does not need to be applied to all feeding parts 5a, and may not be applicable to the feeding parts 5a at the edge.

Figure 8:
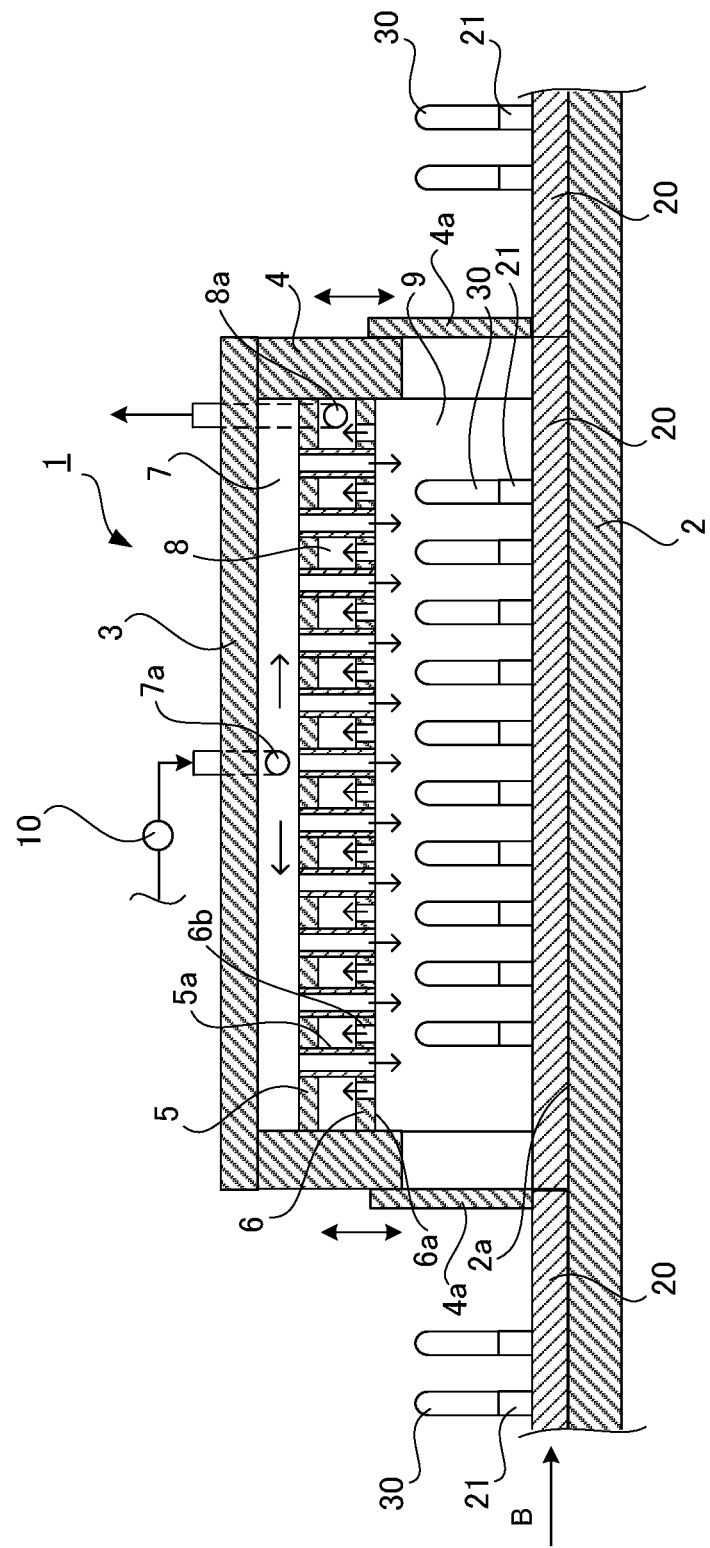
FIG. 8 is a vertical cross-sectional view of a drying device according to yet another embodiment of the present invention.

While the drying device 1 of the above embodiment is a batch type, it may be a continuous type as shown in FIG. 8. The drying device 1 shown in FIG. 8 is configured such that the bed plates 20 having a plurality of molding pins 21 to which the columnar structures 30 are attached are arranged in line on the supporting surface 2a of the bottom plate 2 and pressed in the direction of an arrow B by a pusher (not shown) so as to sequentially travel through the drying space 9. Shutters 4a, 4a capable of being raised and lowered in the directions of the arrows are provided on the respective sides in the conveying direction of the circumferential wall 4, and, with both shutters 4a, 4a being open, the bed plate 20 is accommodated in the drying space 9, then the shutters 4a, 4a are closed, and thus the columnar structures 30 can be dried as in the drying device 1 shown in FIG. 1. In FIG. 8, the same components as in FIG. 1 are given the same reference numbers.

As with the drying device 1 shown in FIG. 1, the above-described various modifications are applicable to the drying device 1 shown in FIG. 8. For example, when providing the guide cylinders 6c shown in FIG. 5 on the drying device 1 shown in FIG. 8, the second partition plate 6 supporting the guide cylinders 6c can be configured so as to be capable of being raised and lowered together with the top plate 3 and the first partition plate 5.

While the feeding parts 5a and the discharge parts 6b are both provided above the columnar structures 30 in the above embodiments, the present invention is not necessarily limited to such an arrangement. For example, the columnar structures may be supported in a suspended manner from the supporting surface, and the feeding parts and the discharge parts may be provided in the opposing surface disposed below the supporting surface.

It is particularly preferable that the columnar structures 30 have a circular cylindrical shape as in the hard capsules of the above embodiments because columnar structures that have a uniform thickness in the circumferential direction after being dried can be produced. Even in the case of a cylindrical shape other than the circular cylinder or in the case of a solid columnar shape as well, the entirety of the columnar structures 30 can be uniformly dried.

Figure 9:
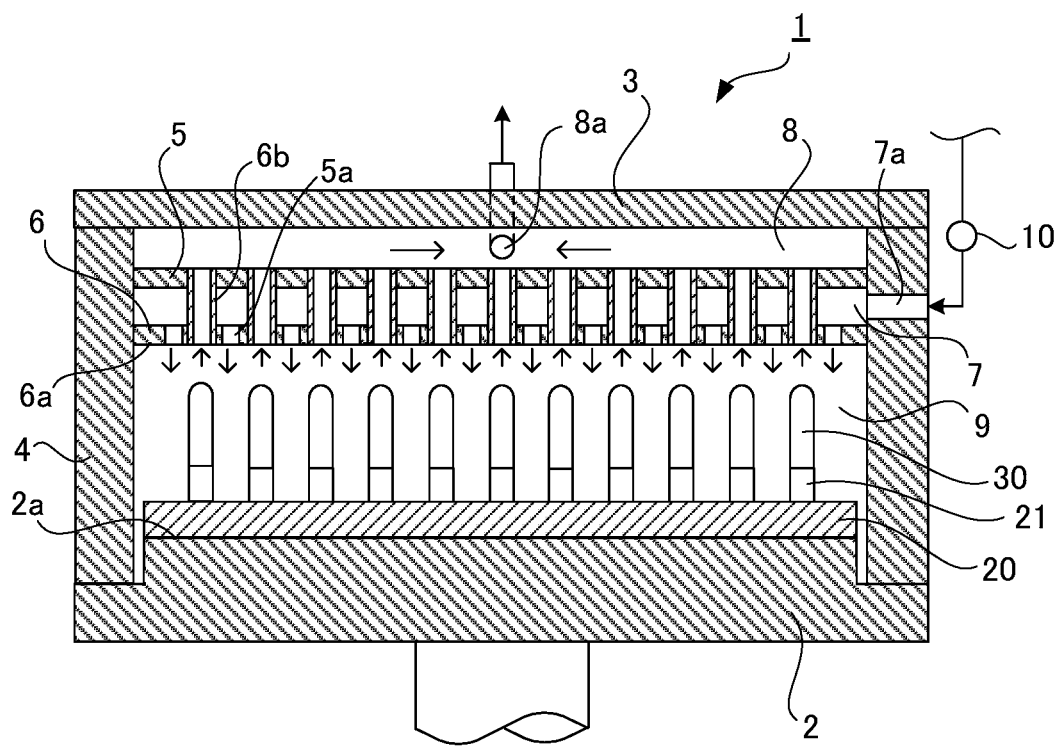
FIG. 9 is a vertical cross-sectional view of a drying device according to yet another embodiment of the present invention.

The flow of drying gas indicated by the arrow in FIG. 1 can be inverted by replacing the introduction path 7 and the discharge path 8 of the drying device 1 shown in FIG. 1 with each other as shown in FIG. 9. In FIG. 9, components having the same functions as those in FIG. 1 are given the same reference numbers.

REFERENCE SIGNS LIST

1 Drying device
2*a* Supporting surface
3 Top plate
4 Circumferential wall
5*a* Feeding part (Introduction tube)
6*a* Opposing surface
6*b* Discharge part
7 Introduction path
7*a* Air supply hole
8 Discharge path
8*a* Discharge hole
9 Drying space
30 Columnar structure

The invention claimed is:

1. A drying device for a plurality of columnar structures supported upright to a supporting surface, wherein
a plurality of feeding parts for feeding drying gas toward the supporting surface and a plurality of discharge parts for discharging the fed drying gas are both provided in an opposing surface facing the supporting surface,
a bed plate is further provided to be removably attached to the supporting surface such that the bed plate is placed at a predetermined position with respect to the supporting surface,
the bed plate is configured to have a plurality of molding pins wherein the columnar structures are respectively attached to the molding pins,
the molding pins are respectively disposed immediately below the discharge parts, and
the feeding parts are respectively disposed away from axes of the molding pins.

2. The drying device for the columnar structures according to claim 1, wherein
the plurality of discharge parts are symmetrically disposed around one feeding part.

3. The drying device for the columnar structures according to claim 1, further comprising
a circumferential wall defining a drying space between the supporting surface and the opposing surface, wherein
the feeding parts and the discharge parts are provided only in the opposing surface on the drying space.

4. The drying device for the columnar structures according to claim 3, wherein
the discharge parts bring the drying space into communication with a discharge path, and
each of the feeding parts comprises an introduction tube extending across the discharge path and facing the drying space.

5. The drying device for the columnar structures according to claim 1, wherein
the discharge parts are respectively disposed on the axes of the molding pins.

6. The drying device for the columnar structures according to claim 3, wherein
the feeding parts bring the drying space into communication with the feeding path, and
each of the discharge parts comprises a tube extending across the feeding path and facing the drying space.

7. The drying device for the columnar structures according to claim 1, wherein
the bed plate has an upper surface on which the molding pins are disposed, and
each of molding pins has an elongated shape extending along its axis, and projects vertically from the upper surface of the bed plate toward the opposing surface such that the columnar structures are supported upright along the axes of the molding pins.

8. A method for manufacturing a columnar structure by drying the columnar structure supported upright to a supporting surface, the method comprising:
a feeding step of feeding drying gas toward the supporting surface from a feeding part provided in an opposing surface facing the supporting surface wherein the feeding part is disposed away from an axis of the columnar structure; and
a discharging step of discharging the drying gas through a discharge part provided in the opposing surface wherein the discharge part is disposed on the axis of the columnar structure.

9. The method according to claim 8, wherein
the columnar structure has an elongated shape extending along its axis, and
the axis of the columnar structure is arranged perpendicular to the supporting surface such that the columnar structure is supported upright on the supporting surface, projecting vertically from the supporting surface.

10. A drying device for a plurality of columnar structures supported upright to a supporting surface, wherein
a plurality of feeding parts for feeding drying gas toward the supporting surface and a plurality of discharge parts for discharging the fed drying gas are both provided in an opposing surface facing the supporting surface,
a bed plate is further provided to be removably attached to the supporting surface such that the bed plate is placed at a predetermined position with respect to the supporting surface,
the bed plate is configured to have a plurality of molding pins,
the columnar structures are respectively attached to the molding pins,
the molding pins are respectively disposed immediately below the discharge parts,
the feeding parts and the discharge parts are disposed either in a staggered form or in a matrix form such that some of the discharge parts are symmetrically disposed around one of the feeding parts, and some of the feeding parts are symmetrically disposed around one of the discharge parts.

11. The drying device according to claim 10, wherein
the feeding parts and the discharge parts are symmetrically disposed with respect to each of the molding pins such that an airflow is created, which uniformly runs along axial directions around the columnar structures.

12. The drying device according to claim 10, wherein
the discharge parts are respectively disposed on the axes of the molding pins.

13. The drying device according to claim 10, wherein
the feeding parts are respectively disposed away from the axes of the molding pins.

14. The drying device according to claim 10, further comprising
a circumferential wall defining a drying space between the supporting surface and the opposing surface, wherein
the feeding parts and the discharge parts are provided only in the opposing surface on the drying space,
the bed plate is configured to travel through the drying space by passing the circumferential wall from an upstream side to a downstream side in a conveying direction,
the circumferential wall has two shutters at the upstream and downstream sides, each of the shutters being configured to be raised to get an open state and to be lowered to get a close state, and
the bed plate moves to the drying space to be accommodated while the shutters are in the open state, after that, the columnar structures on the bed plate are dried by getting the shutters closed.

15. The drying device for the columnar structures according to claim 14, wherein
the discharge parts bring the drying space into communication with a discharge path, and
each of the feeding parts comprises an introduction tube extending across the discharge path and facing the drying space.

16. The drying device for the columnar structures according to claim 14, wherein
the feeding parts bring the drying space into communication with a feeding path, and
each of the discharge parts comprises a tube extending across the feeding path and facing the drying space.

17. The drying device according to claim 10, wherein
the bed plate has an upper surface on which the molding pins are disposed, and
each of molding pins has an elongated shape extending along its axis, and projects vertically from the upper surface of the bed plate toward the opposing surface such that the columnar structures are supported upright along the axes of the molding pins.

18. A method for manufacturing a columnar structure by drying the columnar structure supported upright to a supporting surface wherein discharge parts and feeding parts are provided in an opposing surface facing the supporting surface, and the feeding parts and the discharge parts are disposed either in a staggered form or in a matrix form by some of the discharge parts being symmetrically disposed around one of the feeding parts, and some of the feeding parts being symmetrically disposed around one of the discharge parts, the method for manufacturing the columnar structure comprising:
a feeding step of feeding drying gas toward the supporting surface from the feeding parts provided in the opposing surface, and
a discharging step of discharging the drying gas through the discharge parts provided in the opposing surface.

* * * * *